United States Patent [19]
Reuter

[11] Patent Number: 5,590,936
[45] Date of Patent: Jan. 7, 1997

[54] HYDRAULIC ABS MODULATOR

[75] Inventor: David F. Reuter, Beavercreek, Ohio

[73] Assignee: General Motors Corporation, Detroit, Mich.

[21] Appl. No.: 589,979

[22] Filed: Jan. 23, 1996

Related U.S. Application Data

[63] Continuation of Ser. No. 363,080, Dec. 23, 1994, abandoned.

[51] Int. Cl.⁶ .................................................. B60T 8/48
[52] U.S. Cl. .................... 303/116.1; 303/119.2; 303/901; 303/900
[58] Field of Search ............... 303/DIG. 1, DIG. 2, 303/10, 11, 113.1, 115.1, 115.4, 116.1, 116.2, 117.1, 119.2, 900, 901, 84.2

[56] References Cited

U.S. PATENT DOCUMENTS

| | | | |
|---|---|---|---|
| 5,167,442 | 12/1992 | Alaze et al. | 303/119.2 |
| 5,312,175 | 5/1994 | Ando et al. | 303/117.1 |
| 5,378,055 | 1/1995 | Maas et al. | 303/116.1 |
| 5,403,077 | 4/1995 | Burgdorf et al. | 303/116.2 |

FOREIGN PATENT DOCUMENTS

| | | | |
|---|---|---|---|
| 563965 | 10/1993 | European Pat. Off. | 303/116.1 |
| 5178176 | 7/1993 | Japan | 303/116.1 |
| 6024307 | 2/1994 | Japan | 303/116.1 |

*Primary Examiner*—Matthew C. Graham
*Attorney, Agent, or Firm*—Jeffrey A. Sedlar

[57] ABSTRACT

An ABS hydraulic modulator suitable for vehicular applications is provided. The design utilizes an electric motor which powers a hydraulic pump unit used to recirculate brake fluid during ABS operation. The hydraulic circuit components also include a normally closed ABS release solenoid valve, an integral spring-loaded piston accumulator, an isolation valve and check arrangement, a number of strategically placed flow control orifices and an optional hydraulic damper assembly.

8 Claims, 5 Drawing Sheets

HYDRAULIC ABS MODULATOR

This is a continuation of application Ser. No. 08/363,080 filed on 23 Dec. 1994 now abandoned.

BACKGROUND OF THE INVENTION

This invention relates to fluid brake systems for vehicles.

Conventional vehicle fluid brake systems are characterized by providing the ability for effective wheel braking in response to manual application of force to a brake pedal actuator.

A conventional vehicle fluid brake system includes a master cylinder which is connected by a piping system to brake calipers or wheel cylinders at each wheel. Movement of master cylinder pistons by a brake pedal actuator develops fluid pressure which is transmitted through the piping system to the wheel calipers or cylinders. Braking systems conventionally include a power source which utilizes either engine vacuum and atmospheric pressure or hydraulic pressure to provide power assist or "boost" to the master cylinder in applying fluid force to the braking system.

When a brake pedal is depressed, force is transferred by a push rod to the master cylinder primary piston which moves forward. Under normal conditions the combination of fluid pressure and the force of the primary piston's spring moves a secondary piston forward at the same time. When the pistons move forward, fluid is displaced until front and rear wheel brake linings contact the rotors or drums. Subsequently, hydraulic pressure is built up and transmitted to the front and rear wheels causing the brakes to be applied.

When the brake pedal actuator is released, fluid is forced back through the piping system to the master cylinder. Excess fluid returns to a reservoir which is generally mounted on top of the master cylinder.

The art has adapted conventional vehicle fluid brake systems as thus far described to automatic control mechanisms which intervene in the event of certain conditions and provide advanced braking functions. One such mechanism, an anti-lock braking system (ABS), generally represents a combination of hydraulic and electric control.

A typical ABS system inhibits the vehicle's wheel brakes from locking up by releasing the applied fluid pressure when an incipient wheel lockup condition is sensed. After release of the fluid pressure wheel deceleration ceases and the wheel begins accelerating toward vehicle speed. When the wheel speed has substantially recovered braking fluid pressure is reapplied. Reapplication of fluid pressure can result in the wheel again approaching lockup and therefore, the cycle is repeatable.

The art has proposed that ABS functions can be provided by employing several different mechanisms. The problem posed in developing an ABS braking system is to provide optimum operation considering system response, adaptability and efficiency while concurrently avoiding unnecessary complexity and cost. This presents a significant challenge in the development of vehicle braking systems.

SUMMARY OF THE INVENTION

The present invention concerns a hydraulic ABS modulator concept. The embodiments of the invention utilize a hydraulic pump unit to circulate operating fluid during anti-lock braking situations. The hydraulic circuit components also preferably include a normally closed electromechanical solenoid valve, a form of check valve, a spring-loaded piston accumulator, a unique isolation valve arrangement, a number of strategically placed flow control orifices and an optional hydraulic dampener assembly.

In the non-ABS or base brake operation of the system, fluid is forced from the brake master cylinder into the wheel brakes via flow through the brake lines and the hydraulic modulator. Fluid flow in the modulator is in parallel paths through the isolation valve and through an ABS apply orifice. In base brake operation, when the driver's foot is released from the brake, fluid is forced by wheel brake retraction through the brake lines and the hydraulic modulator back to the master cylinder. For this reverse flow, fluid enters the modulator and passes unrestricted through the check valve back to the master cylinder.

When a predetermined amount of wheel slip is detected in a braking stop, an electronic control unit (ECU) determines that corrective action of brake pressure regulation is necessary. When this occurs ABS operation is engaged wherein the pump is immediately turned on and simultaneously, the normally closed electromechanical solenoid valve (ABS release solenoid) is energized to initiate a pressure release cycle. Flow from the ABS release solenoid immediately starts to fill a pump inlet accumulator which permits immediate pressure reduction at the brake. As the pump motor reaches full speed fluid is then simultaneously pumped from the inlet accumulator back into the inlet of the modulator thus becoming available for use at the wheel for braking needs as required.

To minimize any effects that pump pulsation cycles may have at the driver's foot pedal, a combination pump orifice and damper assembly is preferably used. As pump pulsations occur, a momentary back pressure is created at the orifice which in turn causes the damper to momentarily deflect and absorb any unwanted pulsation. As the pulse diminishes the fluid temporarily stored in the damper is fed back into the system.

Once wheel brake pressures have been sufficiently reduced in an ABS cycle to prevent wheel lock, the system begins increasing pressure at the wheel to maximize braking forces. This is accomplished by deenergizing and thus closing the ABS release solenoid. When the ABS release solenoid is closed, the ABS apply orifice feeds a controlled rate of fluid flow to the wheel brake based upon the pressure differential between the master cylinder and the wheel brake. The ABS apply orifice is sized to compensate for caliper stiffness and to provide the desired ABS apply rate. In addition, the ABS pump is sufficiently sized to supply the flow requirements as determined by the system apply and release rate requirements.

If wheel lock is again approached, the release and reapply cycles are repeated as often as required to achieve the desired ABS control. When wheel brake pressures begin to approach the pressure in the master cylinder the isolation valve is hydraulically forced open and normal base brake function is resumed. If it is desirable to maintain a constant pressure the ABS release solenoid is adaptable to be opened for short durations each followed by a closure for a short duration to achieve an average pressure band width approximation to provide the desired constant pressure.

DETAILED DESCRIPTION OF THE PRESENTLY PREFERRED EMBODIMENT

Figure 1:
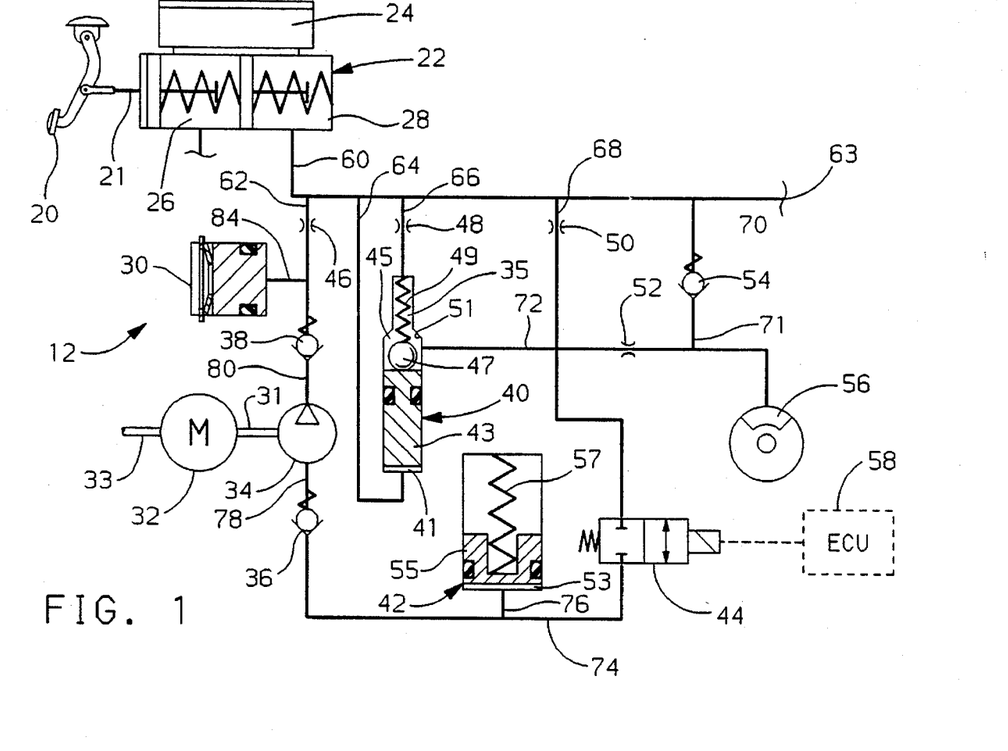
FIG. 1 is a fluid diagram of a brake system incorporating an ABS hydraulic modulator concept according to the present invention.

Referring to FIG. 1, a diagrammatic representation of a brake system 12 is illustrated. System 12 includes a conventional dual piston master cylinder 22 with pressure chambers 26 and 28. Fluid reservoir 24 supplies fluid to master cylinder 22. Through the cooperation of master cylinder 22 with brake pedal actuator 20, by means of link 21, a selectively applied means of manual actuation is provided for system 12.

Leading from pressure chamber 28 of master cylinder 22 is line 60. Connected to line 60 are lines 62, 64, 66, 68 and 70. Through this preliminary fluid supply arrangement, a braking system for a wheel brake 56 is provided with operating fluid. Optionally, line 60 continues from point 63 to an additional wheel brake circuit (not illustrated).

Line 64 provides a means for fluid communication between line 60 and chamber 41 of isolation valve assembly 40. Line 66 includes inlet orifice 48 and provides a means of fluid communication between line 60 and chamber 35 of isolation valve assembly 40. Inlet orifice 48 provides a fixed restriction in line 66 between line 60 and isolation valve assembly 40. Line 68 includes ABS apply orifice 50 and provides a means of fluid communication between line 60 and the normally closed ABS release solenoid valve 44. Line 70 provides a means of fluid communication between line 60 and reverse flow check valve 54.

ABS apply orifice 50 provides a fixed restriction in line 68 between line 60 and line 72 which is interconnected with line 68. Line 72 provides a means of fluid communication between chamber 45 of isolation valve assembly 40 and wheel brake 56. Line 72 is connected to line 71 which extends to reverse flow check valve 54. Outlet orifice 52 provides a fixed restriction in line 72 between its point of connection with line 68 and its point of connection with line 71.

ABS release solenoid valve 44 is in communication with ECU 58. ABS release solenoid valve 44 comprises a normally closed two-position, two-way solenoid operated valve and is positioned between line 68 and line 74 to either permit or prohibit flow therebetween. Line 74 provides a means of fluid communication between ABS release solenoid valve 44 and check valve 36. Line 76 provides a means of fluid communication between line 74 and accumulator 42. Line 78 provides a means of fluid communication between check valve 36 and pump 34.

Pump 34 is driven by electric motor 32 through means of shaft 31. Optionally, shaft 33 extends from motor 32 to drive an additional pump to supply fluid to another brake channel or wheel brake.

Line 80 provides a means of fluid communication between pump 34 and check valve 38. Line 62 provides a means of fluid communication between check valve 38 and line 60. Line 84 extends between line 62 and damper assembly 30. Orifice 46 provides a fixed restriction in line 62 between line 60 and the connection with line 84.

When system 12 is operated in a non-ABS or "base brake" mode, fluid contained in reservoir 24 is forced by master cylinder 22 through line 60 and then flows in parallel routes through lines 66 and 68 to line 72 and on to the wheel brake 56. Fluid flowing through line 66 passes through inlet orifice 48 and isolation valve assembly 40 before reaching line 72. Fluid flowing through line 68 passes through ABS apply orifice 50 before reaching line 72. Upon reaching line 72 all fluid must flow through outlet orifice 52 before reaching the wheel brake 56 in the embodiment of system 12.

Isolation valve assembly 40 requires inlet orifice 48 and outlet orifice 52 to maintain a proper hydraulic force balance. The sizes of these orifices are such that base brake fluid flow is not significantly restricted. Isolation valve assembly 40 is in part kept open during base brake operation by the sufficiently sized spring 49 located on the top of check ball 47 which in-turn presses against piston 43. The force of spring 49 in combination with the hydraulic force balance between inlet orifice 48 and outlet orifice 52 provides sufficient back pressure behind the outlet orifice 52 to keep isolation valve assembly 40 from closing in response to fluid pressure in chamber 41. This effect results from outlet flow orifice 52 being slightly smaller than inlet flow orifice 48.

In the base brake mode of operation for system 12, when a driver's foot is released from brake pedal actuator 20, a reverse flow of fluid results releasing wheel brake 56. From wheel brake 56 fluid flows through line 72 and substantially enters line 71 where it passes unrestricted through check valve 54 to line 70. From line 70 fluid enters line 60 and returns to chamber 28 of master cylinder 22 completing a base brake cycle.

When a predetermined amount of wheel slip occurs for a wheel (not illustrated) associated with wheel brake 56 during a braking stop and the ECU determines that corrective action of brake pressure regulation is necessary, the ABS mode of operation for system 12 is automatically engaged. Motor 32 is immediately turned on and pump 34 begins to operate. Simultaneously, the ABS release solenoid valve 44 is energized to initiate a pressure release cycle. An immediate flow of fluid through ABS release solenoid valve 44 from line 68 to line 74 is effected. This relieves fluid pressure at brake 56 by allowing fluid to pass through line 72 to line 68. The effectively immediate flow of fluid is permitted to pass from line 74 through line 76 and into chamber 53 of accumulator 42 forcing piston 55 to compress spring 57. This responsively reduces the braking pressure at wheel brake 56.

The pressure reduction in line 72 causes piston 43 to force ball 47 to operate as an obturator compressing spring 49 and closing the passage through ball seat 51 between chambers 45 and 35 of isolation valve assembly 40. Thereby, the communication of fluid between lines 72 and 66 is interrupted. The hydraulic area of ball seat 51 for ball 47 is significantly smaller than the hydraulic area of the piston 43. Therefore, once closed, isolation valve assembly 40 is forced to remain closed until the pressures on both inlet orifice 48 and outlet orifice 52 are nearly equalized, at which time the force of spring 49 acts to reopen isolation valve assembly 40. The size of ABS apply orifice 50 is sufficiently small and the opening through ABS release solenoid valve 44 is sufficiently large so that brake pressure regulation continues to occur even though fluid flow is initiated through ABS apply orifice 50 from the pressure differential created between the master cylinder 22 and the wheel brake 56.

In the ABS mode of operation, as the motor 32 achieves full speed, fluid is simultaneously pumped from accumulator 42 back into line 60. The fluid thus becomes available for use at the wheel brake 56 to provide braking operation as needed.

To minimize any effects that pulsation cycles caused by pump 34 may have at the brake pedal actuator 20 as fluid is returned into line 60, a combination pump orifice 46 and damper assembly 30 is optionally used. As pump pulsations occur, a momentary back pressure is created at the pump orifice 46 which in turn causes the damper assembly 30, which is comprised of a piston backed by a very stiff spring, to momentarily deflect and absorb the unwanted pulsation. As the pulse diminishes, any fluid temporarily stored in damper assembly 30 is fed back into the system. This process continues as long as pump 34 is running and pumping release fluid from the wheel brake 56.

When fluid pressure at wheel brake 56 is sufficiently reduced to prevent wheel lock in the ABS mode, the system 12 begins increasing pressure at the wheel brake 56 to maximize braking forces. This is accomplished by deenergizing and thus closing the ABS release solenoid valve 44. When this occurs ABS apply orifice 50 supplies a controlled fluid flow rate based upon the pressure differential between master cylinder 22 and wheel brake 56 to apply braking pressure. ABS apply orifice 50 is sized to compensate for caliper stiffness and to operate at a predetermined desired ABS apply rate. ABS apply orifice 50 is preferably made as thin and as square-cornered as possible so that changes in flow rates for a given pressure differential are minimized for viscosity effects, thus producing more consistent pressure apply rates.

If wheel lock is again approached, the ABS release and apply cycles are repeated as often as required to achieve the desired ABS control. A constant pressure is optionally simulated by opening the ABS release solenoid valve 44 for short durations followed by closure for short durations to provide an average pressure band width approximation of the desired constant pressure.

During the ABS mode of operation of the system 12, when braking pressures begin to approach the pressure at master cylinder 22, the isolation valve assembly 40 is hydraulically forced open and the normal base brake function of system 12 resumes. At any time however, as determined by the ECU 58, the ABS mode of operation may resume through operation of the ABS release solenoid valve 44. The hydraulic circuit of system 12 is applicable to a conventional two, three or four channel braking system.

Figure 2:
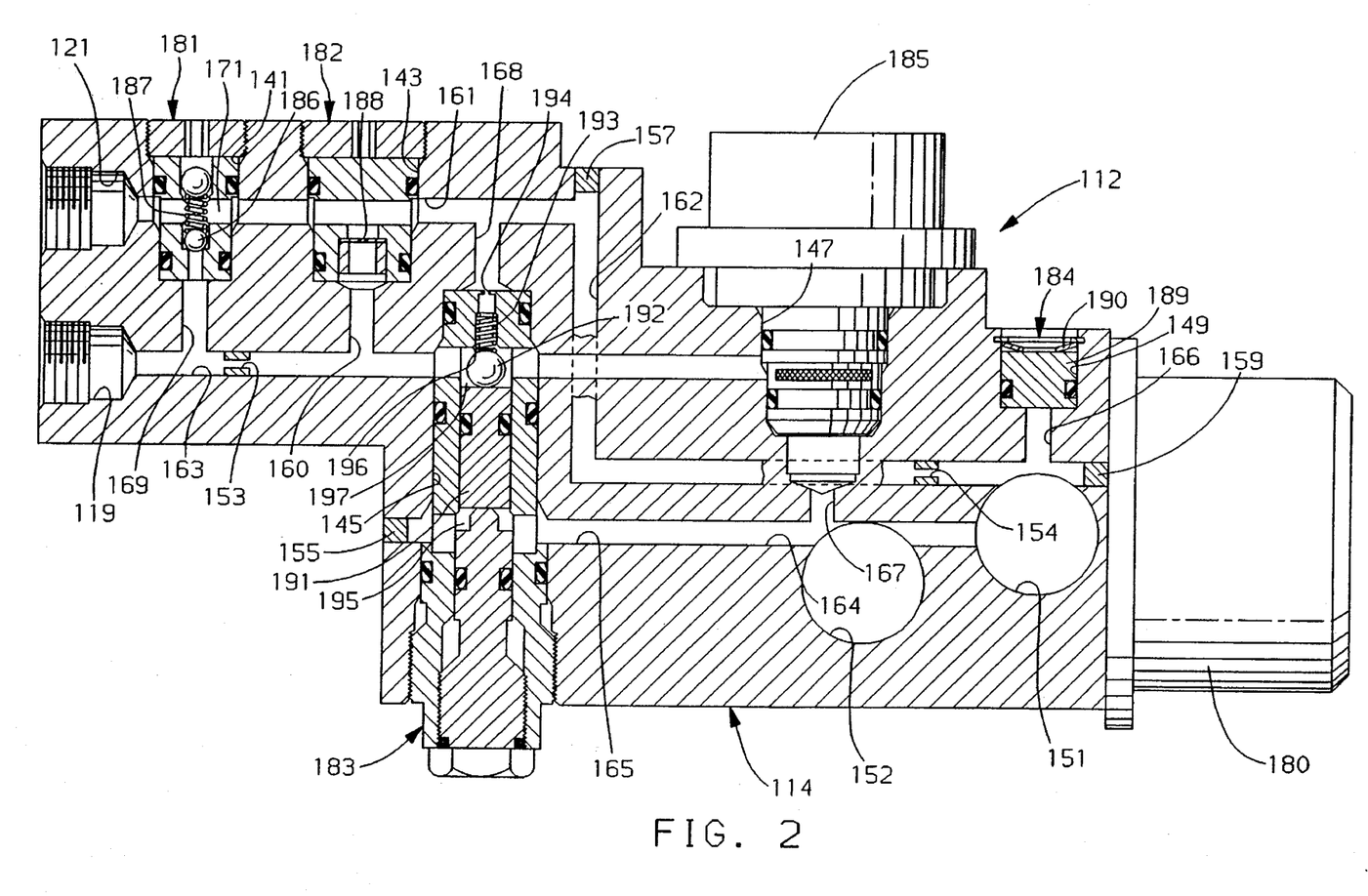
FIG. 2 is a schematic representation of an ABS hydraulic modulator assembly as depicted in the fluid diagram of FIG. 1.

A hydraulic modulator providing the operational features of system 12 is represented in FIG. 2. Module 112 includes body 114 preferably made of metal. Port 121 is formed in body 114 and provides a point of connection for a conduit (not illustrated) which leads to a master cylinder (not illustrated). Extending into body 114 from port 121 through cavity 141 and through cavity 143 is bore 161. Bore 161 terminates at bore 162. Bore 162 includes a plug 157 and extends through body 114 to bore 164. Bore 164 extends from bore 162 through cavity 151 and includes plug 159. Orifice 154 is disposed in bore 164 between cavity 151 and bore 162. Bore 166 extends from bore 164 to cavity 149. Bore 165 extends from cavity 151 through cavity 152 and through cavity 145. Bore 165 includes plug 155. Bore 167 extends from bore 165 to cavity 147. Bore 163 extends from cavity 147 through cavity 145 to port 119. Port 119 provides a point of connection for a conduit (not illustrated) which extends to a wheel brake (not illustrated). Bore 160 extends between bore 163 and cavity 143. Bore 169 extends between bore 163 and cavity 141. An orifice 153 is disposed in bore 163 between the points of connection between bore 163 and bore 160 and between bore 163 and bore 169. Connected to body 114 is a pump motor assembly 180.

Cavity 141 contains reverse flow check valve assembly 181. Fluid flow is permitted through cavity 141 between port 121 and cavity 143 through bore 161. Ball 186 normally obstructs the flow of fluid between cavity 141 and bore 169. Fluid communication is permitted between bore 169 and cavity 141 when fluid pressure in bore 169 is sufficiently great to overcome the fluid pressure in chamber 171 and the force of spring 187.

Cavity 143 contains ABS apply orifice assembly 182. Fluid flow is permitted along bore 161 through cavity 143. Fluid flow is also permitted from cavity 143 to bore 160 through orifice 188.

Cavity 147 contains ABS release solenoid 185. ABS release solenoid valve 185 typically prohibits flow between bore 163 and bore 167. When ABS release solenoid valve 185 is energized and therefore open, flow is permitted between bore 163 and bore 167.

Cavity 149 contains damper assembly 184. Damper assembly 184 includes piston 189 and spring assembly 190. Piston 189 moves to compress spring assembly 190 to dampen fluid pressure pulsations created by a conventionally known pump assembly (not illustrated) in chamber 151. Following a pulse, spring assembly 190 returns piston 189 to its normal position, forcing the fluid in cavity 149 through bore 166 into the system. Cavity 152 contains an accumulator (not illustrated), integrated into the module 112.

Cavity 145 contains isolation valve assembly 183. Isolation valve assembly 183 includes ball 192 which is biased against piston 191 by spring 193. Therefore, fluid flow is typically permitted through orifice 194 between bore 168 and bore 163. When the fluid pressure in bore 165, which is communicated to chamber 195, is sufficient to force piston 191 into chamber 197 and therefore, ball 192 against ball seat 196, the flow of fluid is obstructed between bore 168 and bore 163. Through this construction module 112 provides the operational features of system 12 as described in relation to FIG. 1.

Figure 3:
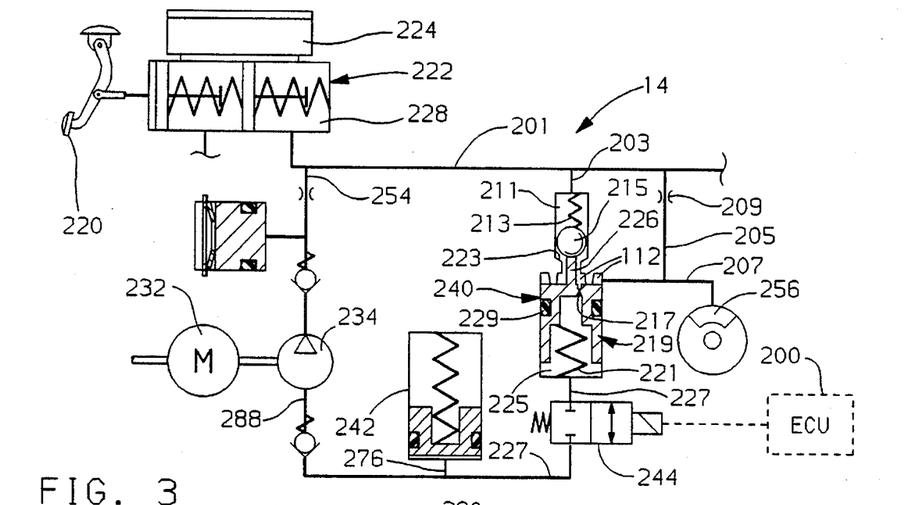
FIG. 3 is a fluid diagram of a brake system incorporating an ABS hydraulic modulator concept according to the present invention.

Referring to FIG. 3, a diagrammatic representation of an alternative embodiment of the present invention is illustrated. Several components of the diagram of FIG. 3 are essentially the same in operation as the corresponding components of the diagram of FIG. 1. A major exception is the isolation valve assembly 240. Compared to system 12 as illustrated in FIG. 1, system 14 as illustrated in FIG. 3 includes an integration of a reverse flow check valve and an ABS release orifice into the isolation valve assembly 240.

In the non-ABS base brake mode of operation of system 14, the application of pressure to brake pedal actuator 220 forces fluid supplied by reservoir 224 from chamber 228 of master cylinder 222 through line 201 to lines 203 and 205 where parallel routes for braking fluid flow are provided. Fluid flowing through line 203 passes through chamber 211 of isolation valve assembly 240, past ball seat 223, through chamber 212 and out through line 207 to wheel brake 256. Fluid flowing through line 205 passes through ABS apply orifice 209 and continues through line 207 to wheel brake 256.

The isolation valve's check valve created by the coaction of ball 215 with ball seat 223 is maintained in an open condition by protrusion 226 which extends from piston 219. Piston 219 and therefore, protrusion 226 are forced to a normal position wherein ball 215 is unseated by a sufficiently sized spring 221. A small orifice 217 is located either in piston 219 as illustrated, or in isolation valve assembly 240 in parallel to piston 219 to permit hydraulic balancing to occur between chambers 211, 212 and 225 to assure that ball 215 normally remains unseated and flow is permitted between lines 203 and 207. Isolation valve assembly 240 has the advantage that no base brake flow orificing between master cylinder 222 and wheel brake 256 is required.

In the base brake mode of operation of system 14, when a driver's foot is released from the brake pedal actuator 220, fluid is forced by retraction of wheel brake 256 through line 207 primarily into chamber 212 wherein it passes unrestricted past ball 215 through chamber 211 and then to line 203 where it continues through line 201 back to the master cylinder 222.

When a predetermined amount of slip of the wheel (not illustrated), associated with wheel brake 256 occurs and the ECU 200 determines that corrective action of brake pressure regulation is necessary, pump 234 is immediately turned on and simultaneously the ABS release solenoid valve 244 is energized to initiate a pressure release cycle. In system 14 the opening of the ABS release solenoid valve 244 causes an immediate pressure drop at the bottom side of the piston 219 in isolation valve assembly 240 through line 227. In response, piston 219 moves against the force of spring 221 which in turn permits the force of spring 213 to urge ball 215 against ball seat 223. Ball 215 operates as an obturator closing the check valve and preventing the unorificed flow of apply fluid from the master cylinder 222 to wheel brake 256. The check valve of isolation valve 240 remains closed until the hydraulic force imbalance is equalized on both sides of ball 215 in chambers 211 and 212 at which time the force of spring 221 is sufficient to reopen the check valve. The drag force of seal 229 is not significant, in-that it is overcome by the spring 221 since the pressures on both sides of piston 219 are substantially at equilibrium.

When the check valve of isolation valve assembly 240 is closed, pressure reduction at wheel brake 256 occurs by the flow of fluid through line 207 and orifice 217 which is appropriately sized and located in the piston 219. Orifice 217 along with the flow area through the ABS release solenoid valve 244 are sufficiently large in relation to ABS apply orifice 209, (for example, flow area differences of approximately 10:1), so that pressure reduction occurs at wheel brake 256 at an acceptable rate. This is the case even though apply fluid flow through the ABS apply orifice 209 results from the pressure imbalance between the master cylinder 222 and the wheel brake 256 resulting from the opening of normally closed solenoid valve 244. Flow through the presently opened ABS release solenoid 244 continues through line 277 and is immediately accepted into accumulator 242 through line 276 to effect an immediate pressure reduction at wheel brake 256. As the motor 232 achieves full speed, fluid is pumped from accumulator 242 through line 288 back into the system through lines 254 and 201.

When the fluid pressure at wheel brake 256 has been sufficiently reduced during the ABS mode of operation to prevent wheel lock, system 14 begins increasing pressure at the wheel to maximize braking forces. This is accomplished by deenergizing the ABS release solenoid valve 244 and thus prohibiting the release of fluid through the normally closed, two-position, two-way valve. When this occurs, a controlled rate of fluid flow through the ABS apply orifice 209 is fed to the wheel brake 256.

If wheel lock is again approached the release and apply cycles are repeated as often as required to achieve the desired ABS control. When the fluid pressure in wheel brake 256 approaches the pressure in the master cylinder 222, isolation valve assembly 240 is hydraulically forced open and the normal base brake operation mode resumes. At any time the ECU 200 may prompt the re-initiation of ABS cycling by operation of the ABS release solenoid valve 244.

Figure 4:
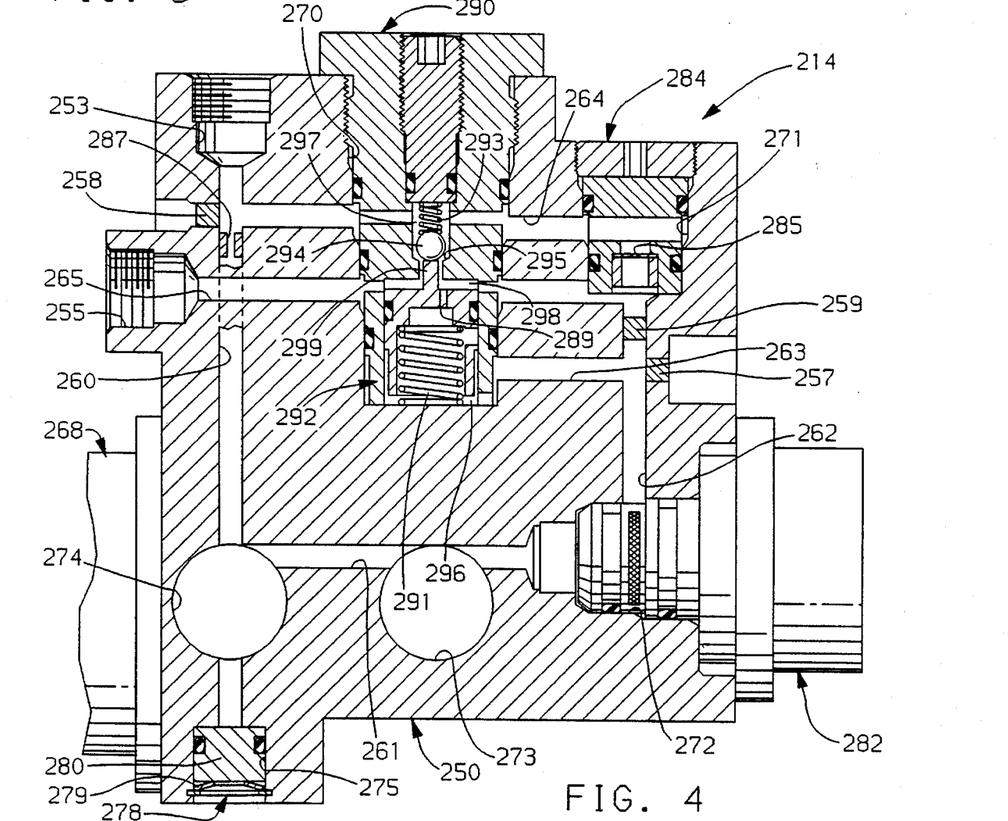
FIG. 4 is a schematic representation of an ABS hydraulic modulator assembly as depicted in the fluid diagram of FIG. 3.

Referring to FIG. 4, illustrated is a representation of a hydraulic modulator providing the operational features of the system 14. Module 214 includes body 250 which is preferably made of metal. Body 250 includes port 253 which provides a point of connection for a conduit (not illustrated) to provide fluid communication with a brake master cylinder (not illustrated). Body 250 also includes port 255 which provides a point of connection for a conduit (not illustrated) to provide a means of fluid communication with a wheel brake (not illustrated).

Bore 260 extends through body 250 from port 253 to cavity 275. Bore 260 passes through cavity 274 and connects with bore 264. Bore 260 includes orifice 287 between its point of connection with bore 264 and its point of communication with cavity 274. Bore 262 extends through body 250 from cavity 271 to cavity 272 and interconnects with bore 263. Bore 262 contains plug 259 between bores 265 and 263. Bore 263 extends through body 250 from bore 262 to cavity 270 and includes plug 257. Bore 261 extends through body 250 from cavity 274 to cavity 272 and passes through cavity 273. Bore 265 extends through body 250 from port 255 to cavity 271 and passes through cavity 270. Bore 264 extends through body 250 from bore 260 to cavity 271 and passes through cavity 270. Bore 264 includes a plug 258.

Disposed in cavity 274 is a pump assembly (not illustrated) as conventionally known in the art to supply fluid pressure to the system. The pump is driven by a pump motor 268. Disposed in cavity 273 is an accumulator (not illustrated), integrated into module 214. Disposed in cavity 275 is a damper assembly 278 that includes piston 280 and spring assembly 279. Piston 280 is moved to compress spring assembly 279 by fluid pressure pulsations in bore 260 which are caused by the pump.

Disposed in cavity 272 is ABS release solenoid 282. In its normally closed condition ABS release solenoid 282 prohibits flow between bore 261 and bore 262. When ABS release solenoid 282 is energized, it opens to permit flow between bore 262 and bore 261.

An ABS apply orifice assembly 284 is disposed in cavity 271. Fluid flowing between the bore 264 and the two bores 262 and 265 through cavity 271, must pass through orifice 285.

Isolation valve assembly 290 is disposed in cavity 270. Fluid flow is normally permitted between bores 264 and 265 through cavity 270 by passing through cavity 297, past ball seat 295 and into cavity 298. Spring 291 forces protrusion 299 of piston 292 to compress spring 293 behind ball 294, thereby normally maintaining ball 294 in an unseated position. Orifice 289 extends through piston 292 and operates to maintain the pressure balance between cavity 296 and cavity 298.

When the wheel brake is pressurized, the pump is running and the ABS release solenoid 282 is open, a relative pressure reduction results in bore 262, bore 263 and therefore, in chamber 296. The reduced pressure in chamber 296 is sufficient to move piston 292 to compress spring 291 whereby protrusion 299 retracts through ball seat 295 and spring 293 urges ball 294 against ball seat 295. Flow between bores 264 and 265 is thereby, obstructed through cavity 270 until the fluid pressures in chamber 297 and chamber 298 are substantially equalized. Through this structure, module 214 provides the operational features diagrammatically illustrated for system 14 in FIG. 3.

Figure 5:
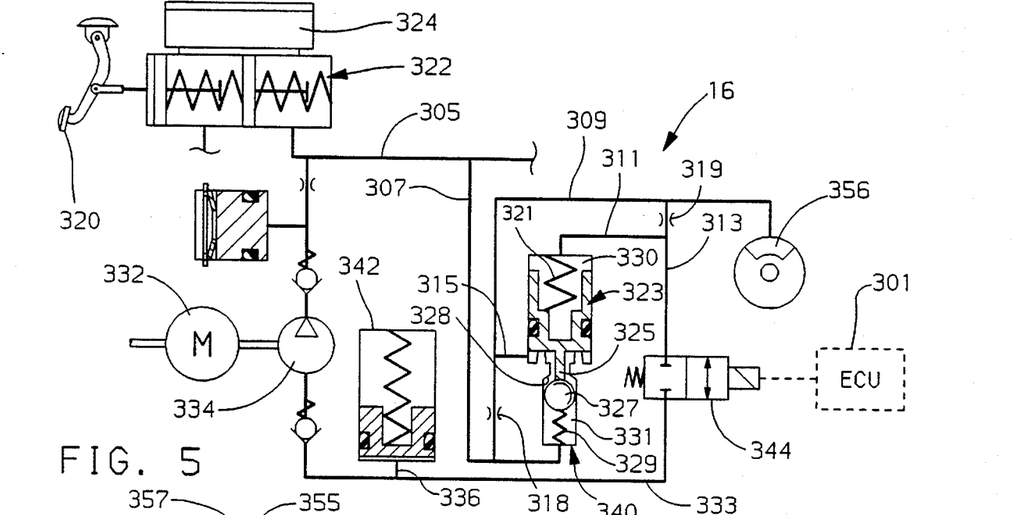
FIG. 5 is a fluid diagram of a brake system incorporating an ABS hydraulic modulator concept according to the present invention.

Referring to FIG. 5, a further embodiment of the present invention is diagrammatically represented. Several components of the system 16 are essentially the same as the corresponding components found in system 12 as illustrated in FIG. 1. Major exceptions include the isolation valve assembly 340 and the ABS release orifice 320.

In the non-ABS or base brake mode of operation of system 16, the master cylinder 322 forces fluid from reservoir 324 into the wheel brake 356. Fluid flowing from master cylinder 322 passes through line 305 and in turn line 307. From line 307 fluid flows in parallel routes to the wheel brake 356. A first route is through line 309 which includes ABS apply orifice 318. A second route from line 307 to line 309 is through the isolation valve assembly 340.

In isolation valve assembly 340, spring 321 forces piston 323 and therefore, protrusion 325 to unseat ball 327 and compress spring 329. Therefore, when fluid force is approximately balanced between chamber 331 and chamber 330, the check valve of isolation valve assembly 340 will be maintained in a normally open condition. This is the case when system 16 is operating in the base brake mode. Base brake fluid flow passes from line 307, in parallel routes through ABS apply orifice 318 and through isolation valve assembly 340 through chamber 331, past ball seat 328, into line 315 to line 309. Pressure equilibrium is maintained between lines 309 and 313 by means of release orifice 319 which assures the isolation valve's check remains open in base brake operation. By maintaining the ball check of isolation valve assembly 340 in an open condition during base brake operation, no base brake flow orificing is required. This results in a preponderance of brake fluid flow through isolation valve assembly 340 in a substantially unrestricted manner.

In the base brake mode of operation, when a driver's foot is released from brake pedal actuator 320, fluid is forced by retraction of the wheel brake 356 back to the master cylinder 322. Fluid passes through line 309 into line 315 where it passes unrestricted past ball 327 into line 307 and then through line 305 to master cylinder 322 and reservoir 324.

When a predetermined amount of wheel slip occurs during a braking stop and the ECU 301 determines corrective action of brake pressure regulation is required, ABS operation is engaged for system 16. The motor 332 is immediately turned on which drives pump 334 into operation. Simultaneously, the ABS release solenoid valve 344 is energized to initiate a pressure release cycle. The opening of the normally closed ABS release solenoid valve 344 causes an immediate pressure drop in chamber 330 of isolation valve assembly 340 as fluid begins to flow through lines 333 and 336 into accumulator assembly 342. The pressure drop in chamber 330 effects movement of the piston 323 to compress spring 321. This causes protrusion 325 to retract through ball seat 328, whereby, spring 329 forces ball 327 against ball seat 328 and to operate as an obturator closing the check valve of isolation valve assembly 340. Closure of the check valve prevents further unorificed flow from the master cylinder to the wheel brake 356 during ABS release. Ball 327 remains against seat 328 until the hydraulic force imbalance between chamber 330 and chamber 331 is essentially equalized on both sides of piston 323. At that time the force of spring 321 is sufficiently strong to move piston 323 and therefore, protrusion 325 to unseat ball 327.

When the check of isolation valve assembly 340 is closed, flow continues through the ABS release orifice 319 and the normally closed ABS release solenoid valve 344 to effect pressure reduction at the wheel brake 356. ABS release orifice 319 and the equivalent orifice size of ABS release solenoid valve 344 are sufficiently large relative to ABS apply orifice 318, (for example, approximately a 10:1 area differential), such that pressure regulation occurs at an acceptable rate. This is the case even though apply fluid flow through the ABS apply orifice 318 is initiated due to the resulting pressure imbalance between the master cylinder 322 and the wheel brake 356 during ABS release.

As motor 332 achieves full speed, fluid is simultaneously pumped from accumulator 342 to line 305 becoming available for use at the wheel brake 356 to provide braking operation as needed.

Once the fluid pressure at wheel brake 356 has been sufficiently reduced to prevent wheel lock, the system 16 begins increasing pressure at the wheel brake 356 to maximize braking forces. This is accomplished by closing the ABS release solenoid valve 344. Fluid is fed via lines 305 and 307 through the ABS apply orifice 318 to the wheel brake 356 at a controlled rate of flow based upon the pressure differential between the master cylinder 322 and the wheel brake 356. Should wheel lock again be approached, the release and apply cycles are repeated as required to achieve the desired ABS control. Once wheel brake pressures begin to approach the pressure in the master cylinder 322 the isolation valve assembly 340 is hydraulically forced open and normal base brake function is resumed. At any time, the ECU 301 may resume ABS cycling by signalling the opening of ABS release solenoid valve 344.

Figure 6:
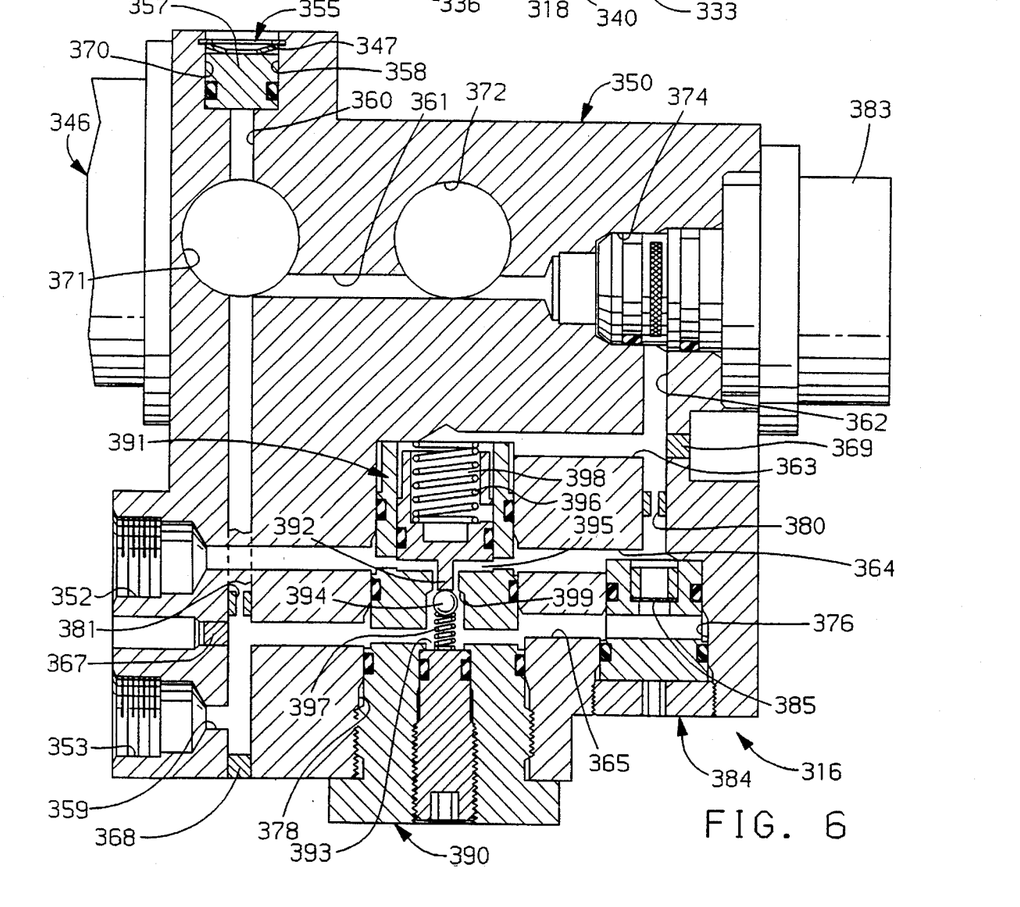
FIG. 6 is a schematic representation of an ABS hydraulic modulator assembly as depicted in the fluid diagram of FIG. 5.

Referring to FIG. 6, illustrated is a representation of a hydraulic modulator arranged to provide the operational features of system 16 as illustrated in FIG. 5. Module 316 includes body 350 which is preferably made from metal. Extending through body 350 from cavity 358 to its point of closure by plug 368 is bore 360. Bore 360 extends through cavity 371 and interconnects with bore 365. Positioned in bore 360 between cavity 371 and its point of interconnection with bore 365 is orifice 381. Bore 361 extends from cavity 374 to cavity 371 and passes through cavity 372. Bore 362 extends between cavity 374 and cavity 376 and interconnects with bore 363. Bore 362 includes orifice 380 which is positioned between cavity 376 and its point of interconnection with bore 363. Bore 363 extends between bore 362 and cavity 378 and is closed by plug 369. Bore 364 extends between cavity 376 and port 352 and passes through cavity 378. Bore 365 extends between cavity 376 and bore 360 and passes through cavity 378. Bore 365 is closed by plug 367. Bore 359 extends between port 353 and bore 360.

Port 353 provides a point of connection for a conduit (not illustrated), which enables fluid communication between module 316 and a brake master cylinder (not illustrated). Port 352 provides a point of connection for a conduit (not illustrated), which enables fluid communication between module 316 and a wheel brake (not illustrated).

Positioned in cavity 370 is damper assembly 355. Damper assembly 355 includes piston 357 and spring assembly 347.

During operation of a conventionally known pump (not illustrated), which is disposed in cavity 371 and driven by pump motor 346, pressure pulsations are modulated by damper assembly 355. When the outlet pressure of the pump in bore 360 is sufficient to move piston 357 to compress spring assembly 347 fluid flows into chamber 358. When the pressure is reduced the fluid flows back out of chamber 358 and into bore 360. An accumulator (not illustrated), is integral with module 316 and disposed in cavity 372 communicating through bore 361 with the pump.

A normally closed solenoid valve, designated as ABS release solenoid valve 383, is disposed in cavity 374. In its normally closed state, ABS release solenoid valve 383 operates to prohibit fluid flow between bores 361 and 362. When the solenoid is actuated, a flow path is opened between bore 361 and 362.

An ABS apply orifice assembly 384 is disposed in cavity 376. Fluid flow is permitted through cavity 376 between the two bores 362 and 364 and the bore 365, through orifice 385.

Positioned in cavity 378 is isolation valve assembly 390. When the hydraulic fluid pressure in chamber 398 is approximately equal to that in chamber 395, spring 396 of isolation valve assembly 390 operates to force piston 391 to move and therefore, protrusion 392 to unseat ball 394. Ball 394 is unseated by protrusion 392 and spring 397 is thereby, compressed. This maintains a normally open flow path between bore 364 and bore 365 through chamber 395 past ball seat 399 and through chamber 393.

When the ABS release solenoid valve 383 is open and the pump is running a pressure reduction is effected in chamber 398. This pressure reduction causes piston 391 to move to compress spring 396 which in turn retracts protrusion 392 through ball seat 399. This allows spring 397 to force ball 394 against ball seat 399 and thus close the flow passage between bore 364 and bore 365 through the isolation valve assembly 390. When the hydraulic fluid pressure in chambers 393 and 395 approach equivalency, spring 396 moves piston 391 and therefore, protrusion 392 to again unseat ball 394. Through the module 316 the operational features of system 16 as illustrated in FIG. 5 are provided.

Figure 7:
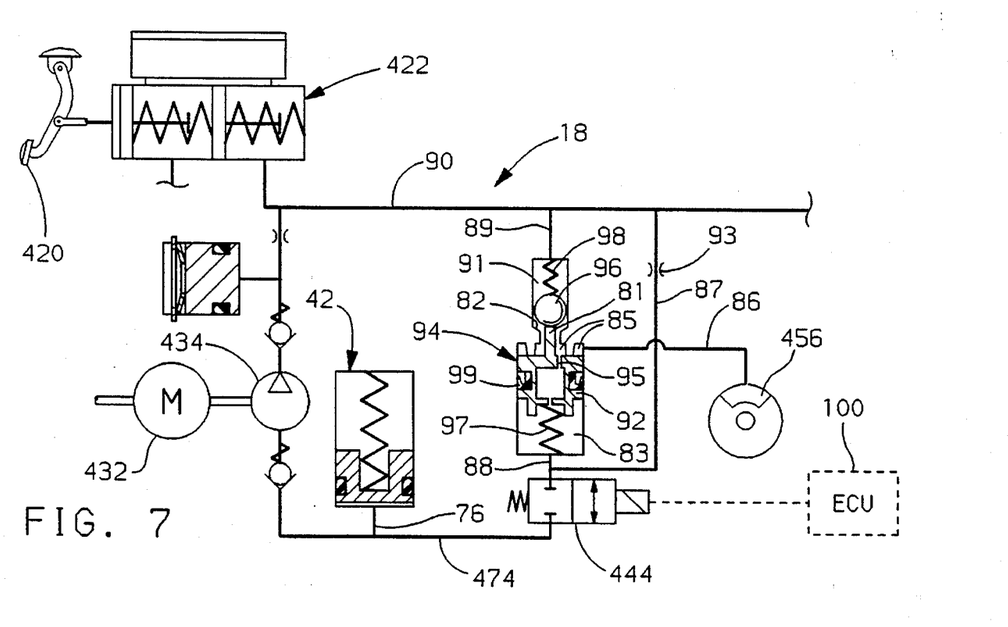
FIG. 7 is a fluid diagram of a brake system incorporating an ABS hydraulic modulator concept according to the present invention.

Referring to FIG. 7, a brake system 18 embodying elements of the present invention is diagrammatically illustrated. System 18 includes several elements that are essentially the same as the corresponding components of system 14 as illustrated in FIG. 3. Exceptions include the isolation valve assembly 94 and the route for fluid flow between the ABS apply orifice 93 and the wheel brake 456.

During base brake operation of the system 18, fluid flowing from master cylinder 422 travels through line 90 to lines 89 and 87. Through lines 89 and 87 parallel routes are provided for base brake fluid flow to the wheel brake 456. One parallel route through line 89 passes through chamber 91 of isolation valve assembly 94 past ball 96 and out line 86 to wheel brake 456. Flow through the other parallel route through line 87 passes through ABS apply orifice 93 and then enters line 88. From line 88, base brake flow enters chamber 83 of isolation valve assembly 94. Isolation valve assembly 94 is equipped with lip seal 99 which is disposed such that when fluid pressure in chamber 83 is higher than fluid pressure in chamber 85 fluid passes lip seal 99 and flows from chamber 83 to chamber 85. This provides a bypass for fluid flow around orifice 95 in one direction. Therefore, the base brake fluid flow that travels through ABS apply orifice 93 substantially flows past lip seal 99 into chamber 85 and then out line 86 to wheel brake 456.

When a predetermined amount of wheel slip is detected in a braking stop and the ECU 100 determines that corrective action of brake pressure regulation is necessary, the ABS mode of operation is engaged. Motor 432 is immediately turned on and ABS release solenoid valve 444 is simultaneously energized to initiate a pressure release cycle. Opening of the normally closed ABS release solenoid valve 444 causes an immediate pressure drop in chamber 83 of isolation valve assembly 94. This effects movement of piston 92 to compress spring 97 whereupon protrusion 81 retracts through ball seat 82 such that ball 96 is forced against ball seat 82 by spring 98 operating as an obturator and thus closing the check of isolation valve assembly 94. The check remains closed until the hydraulic force imbalance subsides and pressure is substantially equalized on both sides of the ball 96, at which time the force of spring 97 is sufficient to reopen the valve by unseating ball 96. The reduced pressure in chamber 83 caused by the opening of ABS release solenoid valve 444 induces a fluid flow from wheel brake 456 through line 86 into chamber 85 and through orifice 95, which reduces braking force and inhibits wheel slip from occurring. When the pressure at wheel brake 456 has been sufficiently reduced to prevent wheel lock, system 18 begins increasing pressure at the wheel to maximize braking forces. This is accomplished by deenergizing ABS release solenoid valve 444 and thus stopping flow through the ABS release orifice 95.

Fluid flow produced by pump 434 or master cylinder 422, during ABS operation, passes through ABS apply orifice 93. The flow of fluid travels through line 87 to line 88 and then through chamber 83 of isolation valve assembly 94. Therefore, ABS apply fluid flow would travel through the ABS release orifice 95 to build up wheel pressure during the ABS apply cycle. However, the use of a lip seal 99 on piston 92 of the isolation valve assembly 94 in place of an O-ring provides a parallel flow passage and improves the flow of fluid to wheel brake 456 during the ABS apply.

Routing the ABS apply fluid flow in this manner results in apply fluid pressure at wheel brake 456 being minimized during the ABS release cycles. This is because apply fluid flowing through the ABS apply orifice 93 during an ABS release cycle enters line 88 and immediately travels through the opened ABS release solenoid valve 444 into line 474. During ABS apply cycles if wheel lock is again approached the release and apply cycles are repeated as often as required to achieve the desired ABS control.

A hydraulic modulator providing the operational features of system 18 is similar to the modulator as illustrated in FIG. 4 with some exceptions, including: the isolation valve assembly 94 incorporates a lip seal to provide the bypass feature instead of an O-ring seal like isolation valve assembly 290, bore 265 between chambers 270 and 271 is nonexistent or plugged, and plug 259 is removed from bore 262.

Figure 8:
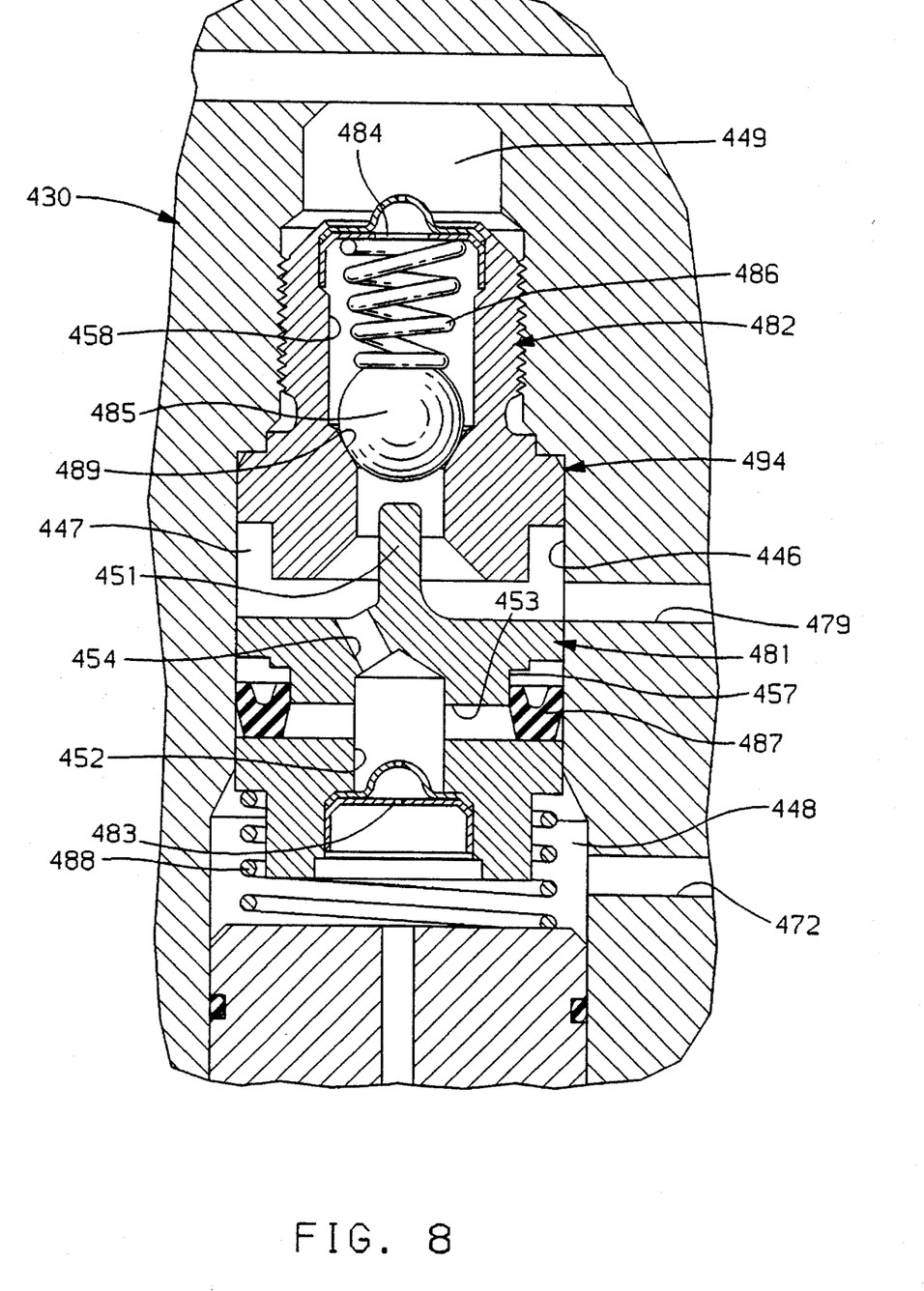
FIG. 8 is a schematic illustration of an embodiment of an isolation valve assembly.

Referring to FIG. 8, illustrated is isolation valve assembly 494 embodying the aspects of isolation valve 94 of system 18. Isolation valve assembly 494 is disposed in bore 446 of module 430. Insert 482 is fixed in position in bore 446 and includes axial bore 458. Formed along axial bore 458 by insert 482 is valve seat 489. Spring retainer 484 engages insert 482 and retains spring 486 in bore 458. Ball 485 is also contained in bore 458 and is biased against valve seat 489 by spring 486.

Also positioned in bore 446 is piston 481. Piston 481 includes circumferential annular groove 457 which carries lip seal 487. Axial bore 452 extends partially into piston 481 and interconnects with release bore 454 which is angularly disposed and interconnected with axial bore 452 such that a fluid passageway is established through piston 481. A cross bore 453 extends through piston 481 at circumferential annular groove 457 and interconnects with axial bore 452. ABS release orifice 483 engages piston 481 and establishes a fixed restriction to flow between axial bore 452 of piston 481 and chamber 448.

Piston 481 also includes protrusion 451 which is shaped for extending through axial bore 458 of insert 482 at valve seat 489. Spring 488 normally biases piston 481 toward insert 482 such that protrusion 451 moves ball 485 to compress spring 486 and remain positioned off valve seat 489. This maintains a normally open flow path between chamber 449 and chamber 447. Chamber 447 is in fluid communication with conductor 479 which leads to wheel brake 456. Therefore, during normal braking operation, fluid entering isolation valve assembly 494 at chamber 449 is free to pass on to a wheel brake such as wheel brake 456 of FIG. 7.

Additionally, fluid flow during normal braking operations passes through an apply orifice, such as apply orifice 93 of FIG. 7, and conductor 472 into chamber 448 whereupon the pressurized fluid compresses lip seal 487 and passes relatively uninhibited into chamber 447 and on through conductor 479 to the wheel brake. Cross bore 453 is positioned adjacent lip seal 487 to facilitate the reverse flow of fluid from chamber 448 to chamber 447 past lip seal 487.

In ABS operation the opening of an associated ABS release solenoid valve, such as valve 444 of FIG. 7, creates a pressure drop in chamber 448 on the bottom side of the base brake isolation valve's piston 481. In reaction piston, 481 moves against the force of spring 488 such that protrusion 451 is retracted from valve seat 489 and ball 485 is biased against the valve seat 489 by spring 486. This closes off flow through the base brake isolation valve between chamber 449 and chamber 447.

The base brake isolation valve assembly 494 will remain closed until the hydraulic force imbalance is substantially equalized between chambers 447 and 448. The drag force of lip seal 487 against the wall of bore 446 is not significant in inhibiting movement of piston 481 to reopen the normal base brake passageway between chambers 449 and 447 by unseating ball 485.

What is claimed is:

1. A brake system modulator having a master cylinder port, a wheel brake port and a bore comprising:

an isolation valve assembly including a piston slidably carried in the bore and having a first side and a second side, and including an obturator engageable with the first side of the piston and a spring engaging a spring side of the obturator biasing the obturator toward the piston with a first chamber defined in the bore on the first side of the piston, a second chamber defined in the bore on the second side of the piston and a third chamber defined in the bore on the spring side of obturator;

an ABS release solenoid valve movable between a closed and an open position and communicating with the bore at the second chamber on the second side of the piston through a first conduit extending from the isolation valve assembly to the ABS release solenoid valve;

a pump having an outlet check valve;

a continuously open flow path through the modulator between the master cylinder and the wheel brake port including an ABS apply orifice assembly with a thin element having an opening forming an ABS apply orifice positioned in the continuously open flow path; and a second conduit extending from the ABS apply orifice to the first chamber of the isolation valve assembly wherein when the ABS release solenoid valve is moved to the open position to effect a pressure reduction at the wheel brake port the continuously open flow path remains open in both directions between the master cylinder port and the wheel brake port.

2. A brake system modulator according to claim 1 wherein the obturator has a first position and a second position and movement of the obturator between the first and second positions is effected by movement of the piston in response to a pressure change in the isolation valve assembly effected by opening and closing of the ABS release solenoid valve wherein when the obturator is in each of the first and the second positions the continuously open flow path remains open in both directions between the master cylinder port and the wheel brake port.

3. A brake system modulator according to claim 1 further comprising a third conduit wherein the third conduit extends from the ABS apply orifice to the third chamber of the isolation valve assembly wherein the thin element is a sharp edged orifice plate wherein a fluid flow path is continuously open in both directions between the second and the third chambers of the isolation valve assembly through the ABS apply orifice of the sharp edged orifice plate.

4. A brake system modulator according to claim 1 wherein the piston has an opening extending through the piston from the first side to the second side and further comprising a calibrated ABS release orifice positioned in the opening wherein a continuously open fluid flow path extends through the piston opening between the first and second chambers.

5. A modulator according to claim 1 having a plurality of wheel brake ports and includes no more than one solenoid valve per wheel brake port.

6. A modulator for operation in a brake system including a master cylinder and a wheel brake operating on fluid, the modulator comprising:

an isolation valve assembly having a piston, a seat and an obturator wherein the piston is normally engageable with the obturator to move the obturator away from the seat, opening the isolation valve assembly;

an orifice assembly having a square cornered opening forming a flow restrictive orifice wherein fluid flow from the master cylinder to the wheel brake through the modulator is normally through both a first path through the flow restrictive orifice and a second path that is independent of the first path through the seat of the isolation valve assembly;

a solenoid operated normally closed valve;

a pump integrated into the modulator; and an accumulator communicating with the pump and selectively communicating with the wheel brake through the solenoid operated normally closed valve wherein the modulator is operable to limit wheel slip by starting the pump and opening the normally closed valve permitting a release of pressure from the wheel brake to the accumulator and, when necessary, a pressure increase at the wheel brake is effected by closing the normally closed valve so that the pump supplies a fluid flow to the wheel brake through the square cornered opening that is controlled by the orifice assembly based on a pressure differential between the master cylinder and the wheel brake.

7. A modulator according to claim 6 further comprising at least one conduit extending between the normally closed valve and both the isolation valve assembly and the wheel brake wherein the conduit is continuously open between the isolation valve assembly and the normally closed valve and between the isolation valve assembly and the wheel brake wherein opening of the normally closed valve permits communication between the wheel brake and the accumulator effecting a reduction in fluid pressure at the wheel brake and in the isolation valve assembly such that the piston moves in response to the opening of the normally closed valve which in turn effects movement of the obturator against the seat closing the isolation valve assembly.

8. A modulator according to claim 6 for operation in a brake system including a plurality of wheel brakes wherein the modulator includes no more than one solenoid operated valve per wheel brake.

* * * * *